(12) United States Patent
Forman et al.

(10) Patent No.: US 7,840,571 B2
(45) Date of Patent: Nov. 23, 2010

(54) SYSTEM AND METHOD FOR INFORMATION MANAGEMENT USING HANDWRITTEN IDENTIFIERS

(75) Inventors: George H. Forman, Port Orchard, WA (US); Timothy P. J. G. Kindberg, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1620 days.

(21) Appl. No.: 10/835,684

(22) Filed: Apr. 29, 2004

(65) Prior Publication Data

US 2005/0246337 A1  Nov. 3, 2005

(51) Int. Cl.
*G06F 17/30* (2006.01)
(52) U.S. Cl. ...................... 707/749; 707/754
(58) Field of Classification Search ............... 707/3, 707/6; 382/305
See application file for complete search history.

(56) References Cited

U.S. PATENT DOCUMENTS

| | | | |
|---|---|---|---|
| 6,968,364 B1* | 11/2005 | Wong et al. ................. | 709/217 |
| 6,999,907 B2* | 2/2006 | Smith ............................ | 703/1 |
| 2002/0129015 A1* | 9/2002 | Caudill et al. ................. | 707/6 |
| 2004/0024758 A1* | 2/2004 | Iwasaki ......................... | 707/3 |
| 2004/0143600 A1* | 7/2004 | Musgrove et al. ......... | 707/104.1 |
| 2004/0151402 A1* | 8/2004 | Sugimoto ................... | 382/305 |
| 2004/0264781 A1* | 12/2004 | Eschbach et al. ............ | 382/226 |
| 2006/0026202 A1* | 2/2006 | Isberg et al. ............. | 707/104.1 |

OTHER PUBLICATIONS

Valveny et al., Application of Deformable Template Matching to Symbol Recognition in Hand-Written Architectural Drawings, IEEE, Proceedings of the Fifth International Conference on Document Analysis and Recognition, Sep. 1999, pp. 483- 486.*
Tolga Bozkaya et al—"Indexing Large Metric Spaces for Similarity Search Queries"—ACM Transactions on Database Systems vol. 24 No. 3 pp. 361-409-1999.
Christos Faloutos et al—"Efficient and Effective Querying by Image Content"—Journal of Intelligent Information Systems vol. 3 No. 3/4-1994-pp. 231-262.
Neomedia Inc Website—"Paperclick"—http://www.neom.com.

* cited by examiner

*Primary Examiner*—John E Breene
*Assistant Examiner*—Dennis Myint
(74) *Attorney, Agent, or Firm*—Lloyd E Dakin

(57) ABSTRACT

The method discloses: scanning an original copy of a handwritten identifier; comparing the identifier to a set of prerecorded identifiers; adding the identifier to the set of prerecorded identifiers, if the identifier shares less than a predetermined similarity with any identifier within the set of prerecorded identifiers; linking the identifier to a set of information; scanning the original copy a second time; matching the second scan of the original copy with the first scan of the original copy; and retrieving the set of information in response to the matching. The system discloses: a computer system; a handwritten identifier; an imaging device for scanning an original copy of a handwritten identifier; an image processing and matching module for comparing the identifier to a set of prerecorded identifiers; a linking module for linking the identifier to a set of information.

16 Claims, 5 Drawing Sheets

SYSTEM AND METHOD FOR INFORMATION MANAGEMENT USING HANDWRITTEN IDENTIFIERS

BACKGROUND OF THE INVENTION

1. Field of the Invention

The present invention relates generally to systems and methods for machine identification, and more particularly for information management using handwritten identifiers.

2. Discussion of Background Art

Information management is an ongoing requirement for both businesses and consumers in a modern electronically connected society. Networked processing and storage resources provide significantly greater information management flexibility and timeliness to users than has been possible in the past. To access such information various shorthand codes and devices are typically used.

For instance, if a user is sitting at a computer, the user need only type in a user code and user password to access a wealth of information. In another instance, the user can scan a bar code or RFID tag to access information or perform a service. In yet another more recent example, individuals are increasingly directing others toward a variety of web-based on-line information pointed to by URLs.

Each of these information management tools however requires a rigid structure and fixed format in order to operate. In the first instance, a computer terminal must be available, in the second instance the bar code or RFID tag must conform to a specific set of interface requirements in order to be properly scanned, and URLs are often quite long making them difficult to type or write and often have errors if copied onto a piece of paper handed to another.

Such limitations are not particularly great when the user has access to a well-defined and well-equipped setting such as a computer lab, a manufacturing facility, or a copier room, where quality control procedures can ensure that the codes and tags correspond to their required format and structure.

However, as society becomes more mobile without ready access to such resources, the rigid format and structural limitations of these information management tools can become quite burdensome. For example, a mobile salesperson, visiting a customer at their place of business and attempting to direct the customer to a specific product on the salesperson's web-site, might have to write down a particularly long and complex URL on their business card. Not only might there not be enough room on the card, but the URL would most likely be difficult for the customer to read or type in themselves without introducing errors.

Alternatively, the mobile salesperson could place a bar code sticker associated with the URL on the business card, however, then the salespersons would need to carry around a stack of bar code stickers for each and every product sold and then would need to tediously flip through them to find the right sticker. Similarly, e-mail addresses can be long and complex and are often forgotten and so perhaps the salesperson could not readily e-mail the customer the necessary product information.

In response to the concerns discussed above, what is needed is a system and method for machine identification that overcomes the problems of the prior art.

SUMMARY OF THE INVENTION

The present invention is a system and method for information management using handwritten identifiers. The method of the present invention includes the elements of: scanning an original copy of a handwritten identifier in response to a first user command; comparing the identifier to a set of prerecorded identifiers; adding the identifier to the set of prerecorded identifiers, if the identifier shares less than a predetermined similarity with any identifier within the set of prerecorded identifiers; linking the identifier to a set of information; scanning the original copy a second time in response to a second user command; matching the second scan of the original copy with the first scan of the original copy; and retrieving the set of information in response to the matching.

Within the system of the present invention there is: a computer system; a handwritten identifier; an imaging device for scanning an original copy of a handwritten identifier in response to a first user command; an image processing and matching module for comparing the identifier to a set of prerecorded identifiers, and for adding the identifier to the set of prerecorded identifiers, if the identifier shares less than a predetermined similarity with any identifier within the set of prerecorded identifiers; a linking module for linking the identifier to a set of information; wherein the image processing and matching module also scans the original copy a second time in response to a second user command, and matches the second scan of the original copy with the first scan of the original copy; and wherein the computer system retrieves the set of information in response to the matching.

These and other aspects of the invention will be recognized by those skilled in the art upon review of the detailed description, drawings, and claims set forth below.

DETAILED DESCRIPTION OF THE PREFERRED EMBODIMENT

The present invention provides a system and method for creating and using handwritten identifiers, which enable users to manage information in a very flexible and convenient manner. The present invention is particularly useful in unstructured, mobile, and resource limited settings. Using handwritten identifiers, users can point to information without a need to carry around stickers or tags, or tediously write out long and complex URLs or e-mail addresses. Instead the user could just place a handwritten identifier on a business card, an object, a document and the like in a very easy and straightforward manner. This handwritten identifier would then point to a set of information resources or functional services, which could then be readily accessed.

It is important to note that the present invention should not be confused with certain "handwriting recognition" prior art. In such prior art, a computer stores a predetermined number of fixed identifiers (e.g. the 26 letters of the alphabet). Users then attempt to carefully mimic the input associated with one of those fixed identifiers using free-hand movements (e.g. a user attempts to hand write the letter "A" using a stylus on a handheld computer). Such a handheld computer then attempts to identify one of the predetermined number of fixed identifiers based on prior inputs (e.g. multiple prior input recordings or an abstract handwriting model) already associated with that identifier (e.g. the ASCII code for the letter "A").

In contrast, the present invention allows the user to record new random identifiers. Thus instead of the number of identifiers remaining fixed, as in "handwriting recognition" art, the present invention has no limit to the number of identifiers. Also, whereas "handwriting recognition" art attempts to "interpret" the many handwritten variations in a user's attempts to create the letter "A", in the present invention there is only a single handwritten mark associated with one identifier (no handwritten variation thereafter, but there may be perhaps some limited variation due to lighting and imaging). Thus later when the identifier is re-imaged, the present invention does not attempt to "interpret" the identifier, rather the present invention merely attempts to "match" the identifier to one of a set of prerecorded identifiers. Finally, the user's handwritten identifier can be linked to a URL, a bar code, or other information as discussed below.

Identifier Creation and Linking

Figure 1:
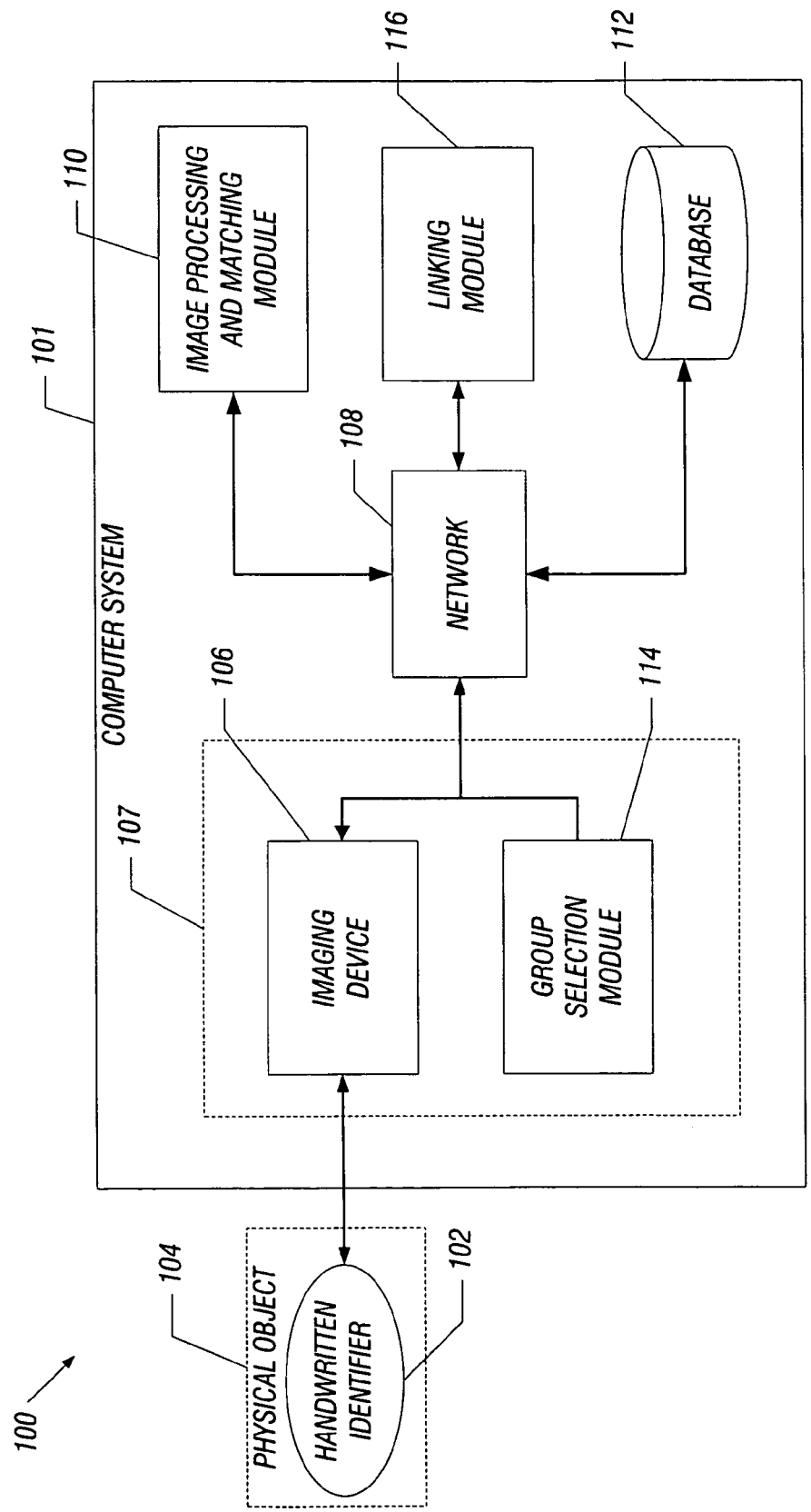
FIG. 1 is a dataflow diagram of one embodiment of a system for information management using handwritten identifiers.

FIG. 1 is a dataflow diagram 100 of one embodiment of a computer system 101 for information management using handwritten identifiers. To begin, a user (not shown) creates an original copy of a handwritten identifier 102. The user is preferably a human being, but in an alternate embodiment could be a machine. The handwritten identifier 102 can be any mark or pattern, including: a random scribble, a carefully drawn shape, a pictorial shape, a smudge, a paint or ink splash, a surface irregularity such as a dent, a scratch, random rough edges from torn piece of paper, a sticker, or any set of markings in any variety of colors. "Original copy" is herein defined as the original marks made by the user (e.g. a users original pen marks on a piece of paper).

The handwritten identifier 102 is preferably created by the user contemporaneously as needed and using some sort of instrument or whatever is readily available. The instrument could be a writing implement (e.g. a pen or a pencil), a sharp instrument, the user's own finger, or any other authoring tool. In alternate embodiments, the handwritten identifier 102 can downloaded from a database of pre-stored marks, which could have originally been made by a person. Preferably the handwritten identifier 102 is delimited in some way, whether by lines or sufficient white space so as to be more evident to others where the mark is. Delimited includes including a triangle, circle, or some other boundary within the identifier 102. The identifier 102 can also be a hand-delimited existing mark, herein defined as a drawing a circle or some other boundary around some existing mark, such as words or letters already printed on a page.

In an alternate embodiment, the handwritten identifier 102 could be replaced with a human-directed identifier. The human-directed identifier is herein defined within the present invention to include not only the handwritten identifier 102, but also to include any sort of identification which is made under human-direction and human movements, including any human body movements such as a hand movement, a foot movement, an eye movement, as well as various human-directed movements, such as causing one's pet animal to put a paw print identifier on a business card, and when a user uses a handheld computer stylus to scribble a mark on a display which is then printed out as the identifier. In general the user is creating some sort of unique image (i.e. piece of art) for use as the identifier, unlike most writing whose goal is to transcribe certain known information (e.g. writing or sketching or painting).

Such human-directed movements however do not preferably include human operation of a computer program in which the program, and not the human, directly generates a predefined or mathematically based set of marks, other than those used to translate a human generated mark, such as a scribble, as discussed above.

Next, the user places the identifier 102 on a physical object 104. The physical object 104 can be anything including a paper document, a business card, a shipping box, a CD, or a circuit board. Typically creation and placement of the handwritten identifier 102 will be simultaneous, such as when the user takes a pen and scribbles a mark on a document or surface of the physical object 104. In other instances the identifier 102 may first be created or printed on a separate label or scrap of paper before being affixed to the object 104, such as when a pen can not readily write on the object due to it's surface properties.

An imaging device 106 records (i.e. scans) an image of the original copy of the handwritten identifier 102. The imaging device 106 is preferably a scanner incorporated into a device 107 of some sort, such as a handheld computer, a cell-phone, or a camera. The image of the handwritten identifier 102 is herein defined to include the handwritten identifier 102 and a set of background information around the identifier 102. The background information is a set of extra markings (i.e. an image outside and preferably not a part of the identifier 102), which can vary based on when, how, and under what conditions the handwritten identifier 102 was scanned. For instance, if the user first images the handwritten identifier 102 and then places the handwritten identifier 102 on the object 104, the image will not include an image of a portion of the object 104. However, if the user directly writes the handwritten identifier 102 on to the object 104, the image will include an image of a portion of the object 104. Some examples of background information include: words on a page which the handwritten identifier 102 was scribbled on to; surface features of the object 104; variations in a size of the image (e.g. was a large area scanned in order to capture the handwritten identifier 102 or was just a small area about the size of the handwritten identifier 102 itself scanned); lighting or angle variations depending upon how the handwritten identifier 102 was scanned; whether the handwritten identifier 102 was centered within the image; and so on.

A set of prerecorded identifiers (not shown) are stored in a database 112 connected to a network 108. The network 108 is likely to be a wireless network but could also be a wired network. In some embodiments of the present invention, the prerecorded identifiers are partitioned into predefined groups of identifiers, such as a user's private identifier group, a family identifier group, a community identifier group, an organizational identifier group, a company identifier group, a home identifier group, a work identifier group, and so on. Groups can even be defined by the identifier's 102 delimiter. Such partitioning enables database 112 queries to be more distributed and decentralized, thereby yielding better performance than for a centralized service. Partitioning also cuts down on an amount of processing required and reduces a chance of unintended similar identifiers (i.e. if there were only a single worldwide database of identifiers, it would eventually be difficult for a user to generate a sufficiently unique identifier). Efficient storage of the identifiers may require that a set of databases (not shown) be hosted by the network 108, each storing different groups of pre-recorded identifiers.

If the prerecorded identifiers are grouped, a group selection module 114 preferably selects one or more of the predefined groups. Group selection narrows down a number of prerecorded identifiers which are compared to the handwritten identifier 102. Selection is preferably done in response to a user command.

The imaging device 106 transmits the image over the network 108 to an image processing and matching module 110. In some embodiments of the present invention where network 108 bandwidth is limited, the imaging device 106 computes a small "signature" of the image using, for example, either a Fourier transform, wavelets, or a histogram of space-filling bubbles, which is then sent over the network 108 to the image processing and matching module 110. Also, since images of the handwritten identifier 102 from the imaging device 106 may be rotated or taken from slightly different distances, the imaging device 106 preferably either selects image features for the signature which are scale and rotation invariant, or normalizes the image in scale and rotation, such as by the common method of determining the major axis, before generating and sending the signature over the network 108.

The image processing and matching module 110 uses segmentation to distinguish the set of background information within the scanned image from the handwritten identifier 102. Segmentation is a known image processing term which means to determine what different regions of an image are (e.g. segmenting an image of a scanned page into lines, words and finally characters). Segmentation enables the image processing and matching module 110 to focus on analyzing and possibly recognizing the handwritten identifier 102 with as little clutter from the background information as possible. Segmentation is preferred since, as discussed above, one same handwritten identifier can have multiple distinct images depending upon on how, when, and under what conditions the imaging device 106 scanned the same identifier. Segmentation is performed using standard pattern recognition techniques. Preferably the handwritten identifiers 102 have a distinctive form, such as having a roughly geometric shape, or look, such as being written or created in a specific color. Such a distinctive form more readily enables the image processing and matching module 110 to distinguish the handwritten identifier 102 from the set of background information, especially if the background information is fairly detailed and complex.

Figure 2:
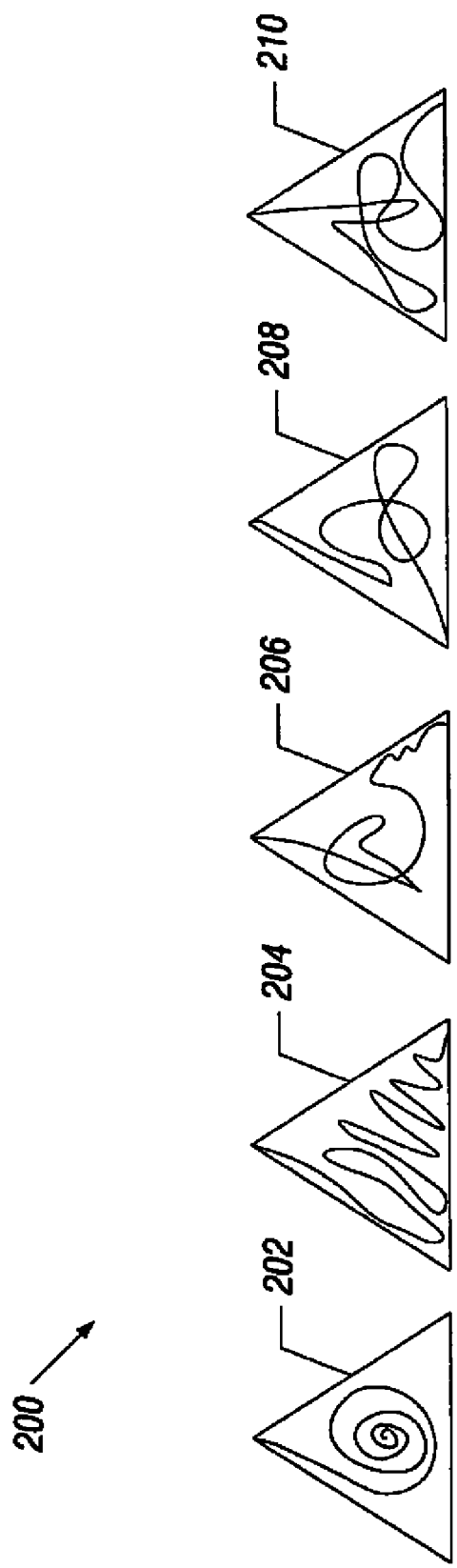
FIG. 2 is a pictorial diagram of one embodiment of a set of handwritten identifiers.

FIG. 2 is a pictorial diagram 200 of one embodiment of a set of handwritten identifiers 202, 204, 206, 208, and 210. While the set of handwritten identifiers 202, 204, 206, 208, and 210 are all in a roughly triangular shape, which aids the image processing and matching module's 110 segmentation algorithm, they are also unique. For instance: handwritten identifier 202 includes a spiral type shape; handwritten identifier 204 includes a wavy type shape; while handwritten identifiers 206 through 210 include more complex scribbles.

Next, the image processing and matching module 110 compares the original copy of the handwritten identifier 102, or the signature of the handwritten identifier 102, against the set of prerecorded identifiers (not shown) stored in the database 112 or against a subset of the prerecorded identifiers stored within the selected groups. The image processing and matching module 110 then identifies a set of potentially matching prerecorded identifiers stored in the database 112. In some cases, the image processing and matching module 110 requests additional image data from the imaging device 106 if needed to complete the comparison of the handwritten identifier 102 with the set of potentially matching prerecorded handwritten identifiers.

The comparison is performed to ensure that the handwritten identifier 102 the user has just created does not share more than a predetermined amount of similarity with the prerecorded handwritten identifiers. As is discussed below, too much similarity would defeat an ability of the handwritten identifier 102 to be uniquely linked to a predetermined information resource. The comparison is performed using standard image processing, matching, and pattern recognition techniques, such as those used by law enforcement for fingerprint searching and matching.

If the image processing and matching module 110 determines that the database 112 already contains one or more prerecorded identifiers which shares more than the predetermined amount of similarity with the handwritten identifier 102, the image processing and matching module 110 sends a request over the network 108 for a new handwritten identifier. The image processing and matching module 110 then receives the new handwritten identifier from the user. The user can either generate an entirely new handwritten identifier, or enhance (e.g. adds some random marks to) the original handwritten identifier 102.

The image processing and matching module 110 again performs the Compare, Identify, Request, Send, and Receive steps until the identifier shares less than the predetermined amount of similarity with the prerecorded identifiers. Thus, the image processing and matching module 110 keeps requesting new handwritten identifiers until the user generates a handwritten identifier which has not already been stored in the database 112.

While shown as separate, the imaging device 106 and the image processing and matching module 110 can be combined within a single device, such as a personal digital assistant with sufficient processing power and memory. A blend is also possible with some image processing and matching module 110 functions available with the imaging device 106 and other functions available over the network 108. The blend may also depend upon available network bandwidth, such that a preprocessed or compressed version of the image is transmitted over the network 108.

If the image processing and matching module 110 determines that the identifier 102 shares less than the predetermined amount of similarity with the prerecorded identifiers (i.e. the handwritten identifier 102 has been approved), a linking module 116 sends a request over the network 108 that the user identify a set of information to be linked within the database 112 to (i.e. associated with) the handwritten identifier 102.

The set of information linked to the identifier 102 can have a variety of forms, including: a multi-digit GUID, a bar code, a URL, telephone numbers, computer files, and so on. The set of information may also have an associated "action type" (i.e. display, execute, etc.) which causes a set of client software to effect a set of actions in response to the identifier 102. The set of actions may include: displaying or presenting a set of information (e.g. a web page, a URL, an online database, an MP3 file, an email address, a text string, or a bar code SKU number) to the user; sending a message (e.g. e-mail or page) to someone; unlocking a door; and recording a location of the object, granting the user a set of create, edit or delete permissions in a database; incrementing a popularity or voting counter; adding to a Web log (blog) associated with the handwritten identifier 102 (e.g. to log maintenance performed on a portion of an aircraft), or change some information (e.g. updating a URL to fix a broken link or change the associated Web page); booking a conference room; causing a program to run on a client computer; causing room settings (e.g. air conditioning, lighting, etc.) to assume a personal set of preferences; and so on.

In some embodiments, the set of actions effected depend upon a set of client software. For instance, a web browser client in response to information within a URL may either take an action to display information associated with a HTML-type URL or download and execute a program associated with an .exe-type URL.

In other embodiments, the set of actions depend upon how the identifier 102 is scanned. For instance, if a user scans the identifier 102 using a fax machine, the associated action may be to fax or email a document to the user, whereas, if the user scans the identifier 102 using a handheld computer, the associated action may be to save a URL to the user's handheld computer which the user can then later access to download a copy of the document.

The linking module 116 links the handwritten identifier 102 to the set of information identified by the user. Then the identifier 102 is stored in the database 112 and becomes part of the set of prerecorded identifiers.

Identifier Re-Imaging, Information Display, and Effecting Actions

Up until now a system and method for creating, comparing, approving, and linking the handwritten identifier 102 has been discussed. Next, a system and method for re-imaging (i.e. scanning the original copy of the identifier a second time) and accessing the set of information linked to the handwritten identifier 102 is discussed.

First, the device 107 prompts the user to select between either an identifier creation mode or a re-imaging mode. If the identifier creation mode is selected, the system 101 permits the user to associate a new handwritten identifier with a set of information, as discussed above with respect to the Identifier Creation and Linking.

If the identifier re-imaging mode is selected, the system 101 re-images the identifier 102 using the imaging device 106. Re-imaging is herein defined as capturing for a second time an image of the original copy of the handwritten identifier which previously had been scanned a first time, stored in the database 112, and linked to a set of information. Note that the identifier 102 may also be re-imaged using other imaging devices as well.

It is important to note that the original copy of the handwritten identifier 102 is being re-imaged, and that a new copy is not being made to look similar to the original copy. In this way the present invention distinguishes itself from various "handwriting recognition" techniques wherein a user generates a new copy of some sort of symbol which the "handwriting recognition" system then attempts to "interpret" as equivalent to a previously defined character or word.

The image processing and matching module 110 compares the handwritten identifier 102 against the set of prerecorded identifiers stored in a database 112. If the image processing and matching module 110 determines that the database 112 already contains one or more prerecorded identifiers which share more than the predetermined amount of similarity with the identifier 102, the image processing and matching module 110 either requests that the imaging device 106 transmit more information to help identify the handwritten identifier 102 or presents the user an opportunity to select which prerecorded handwritten identifier best corresponds to the re-imaged handwritten identifier 102.

The image processing and matching module 110 then matches the re-image of the original copy with the original copy stored within the set of prerecorded identifiers, and the computer system 101 retrieves the set of information associated with the handwritten identifier 102.

The group selection module 114, image processing and matching module 110, and linking module 116 of the computer system 101 of FIG. 1 can be computer program code embodied in a computer-usable medium for commanding the computer system 101 to perform corresponding tasks.

Figure 3:
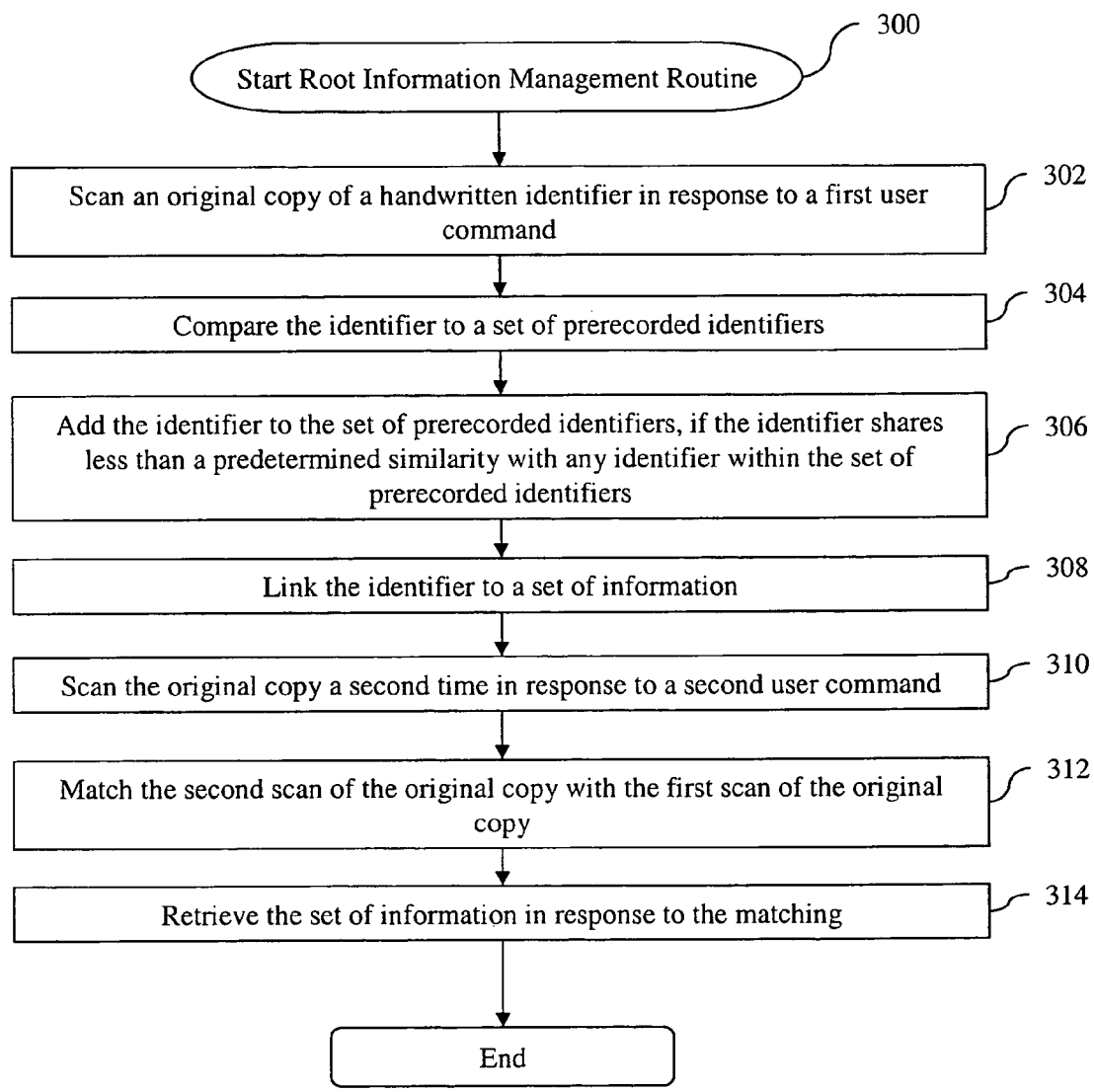
FIG. 3 is a flowchart of one embodiment of a root method for information management using handwritten identifiers.

FIG. 3 is a flowchart of one embodiment of a root method 300 for information management using handwritten identifiers. The method 300 begins in step 302 where the imaging device 106 scans an original copy of a handwritten identifier in response to a first user command. In step 304, the image processing and matching module 110 compares the identifier to a set of prerecorded identifiers. In step 306, the image processing and matching module 110 adds the identifier to the set of prerecorded identifiers, if the identifier shares less than a predetermined similarity with any identifier within the set of prerecorded identifiers. In step 308, the linking module 116 links the identifier to a set of information. In step 310, the imaging device 106 scans the original copy a second time in response to a second user command. Then in step 312, the image processing and matching module 110 matches the second scan of the original copy with the first scan of the original copy. In step 314, the computer system 101 retrieves the set of information in response to the matching.

Figure 4A:
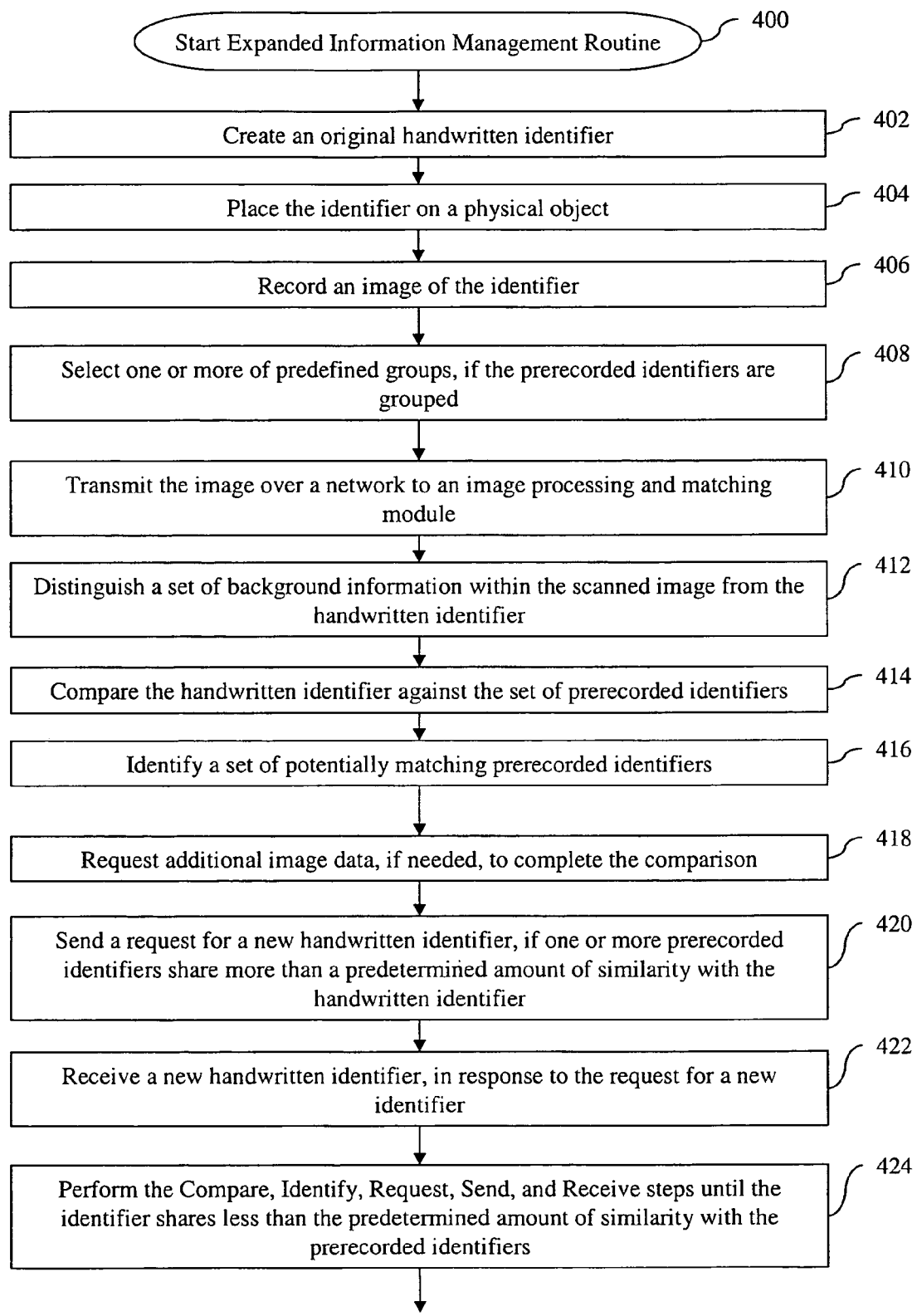
FIG. 4 is a flowchart of one embodiment of a method for information management using handwritten identifiers.
Figure 4B:
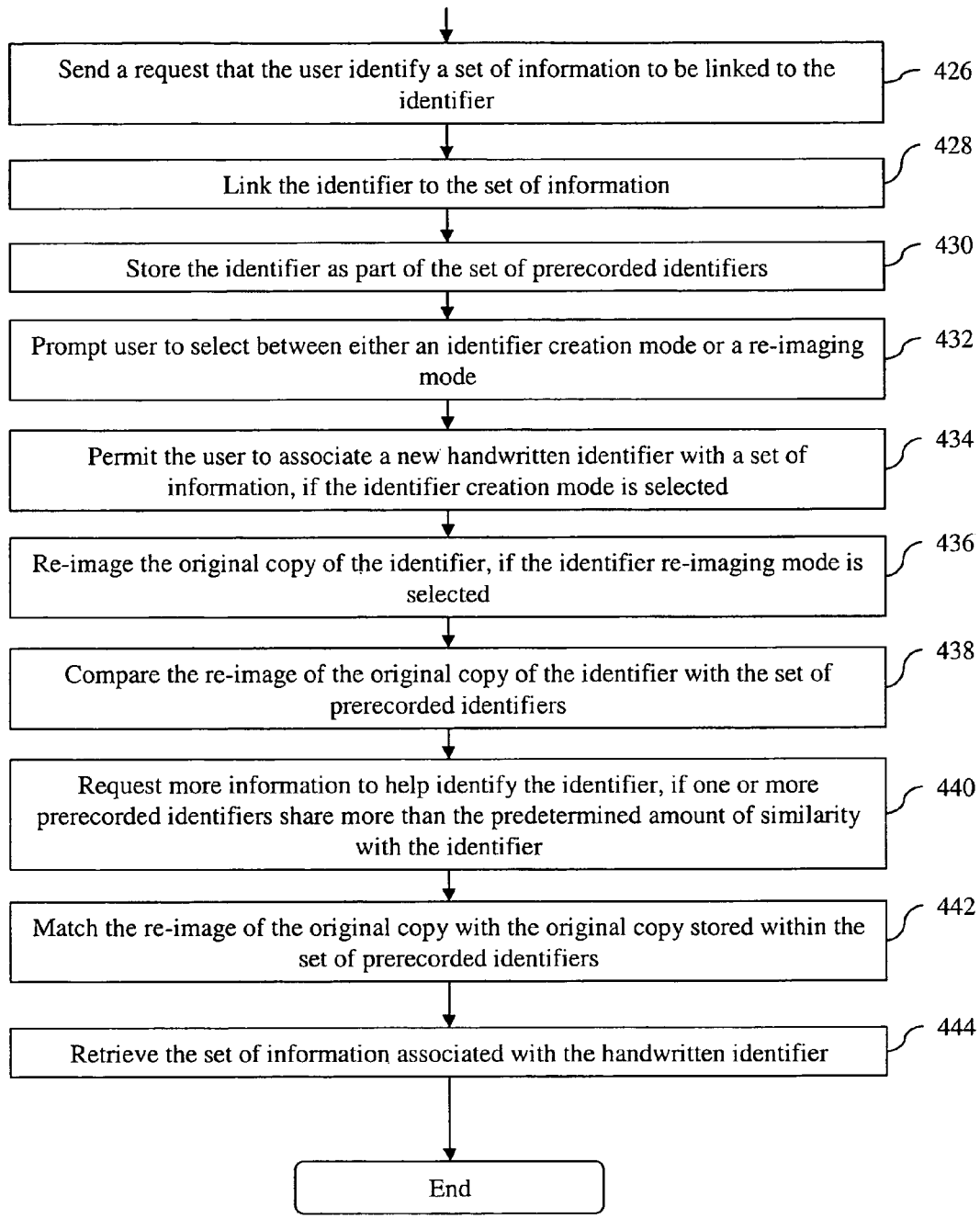

The root method 300 is discussed in further detail with respect to FIG. 4.

Identifier Creation and Linking

FIG. 4 is a flowchart of one embodiment of a method 400 for information management using handwritten identifiers. To begin, in step 402, a user creates an original copy of a handwritten identifier 102. In step 404, the user places the identifier 102 on a physical object 104. In step 406, an imaging device 106 records an image of the handwritten identifier 102. In step 408, if the prerecorded identifiers are grouped, the group selection module 114 selects one or more of the predefined groups. In step 410, the imaging device 106 transmits the image or a signature of the image over a network 108 to the image processing and matching module 110.

In step 412, the image processing and matching module 110 uses segmentation to distinguish the set of background information from the scanned image of the handwritten identifier 102. Next, in step 414, the image processing and matching module 110 compares the handwritten identifier 102, or the signature of the handwritten identifier 102, against the set of prerecorded identifiers stored in the database 112 or against a subset of the prerecorded identifiers stored within the selected groups.

In step 416, the image processing and matching module 110 identifies a set of potentially matching prerecorded identifiers stored in the database 112. In step 418, in some embodiments of the present invention, the image processing and matching module 110 requests additional image data from the imaging device 106 if needed to complete the comparison of the handwritten identifier 102 with the set of potentially matching prerecorded handwritten identifiers.

In step 420, if the image processing and matching module 110 determines that the database 112 already contains one or more prerecorded identifiers which shares more than the predetermined amount of similarity with the handwritten identifier 102, the image processing and matching module 110 sends a request over the network 108 for a new handwritten identifier. In step 422, the image processing and matching module 110 receives either the new handwritten identifier or an enhanced version of the original handwritten identifier 102 from the user. In step 424, the image processing and matching module 110 again performs the Compare, Identify, Request, Send, and Receive steps (i.e. steps 414 through 422) until the identifier shares less than the predetermined amount of similarity with the prerecorded identifiers.

In step 426, if the image processing and matching module 110 determines that the identifier 102 shares less than the predetermined amount of similarity with the prerecorded identifiers, a linking module 116 sends a request over the network 108 that the user identify a set of information to be linked to the handwritten identifier 102. In step 428, the linking module 116 links the handwritten identifier 102 to the set of information identified by the user. In step 430, the identifier 102 is stored in the database 112 and becomes part of the set of prerecorded identifiers.

Identifier Re-Imaging, Information Display, and Effecting Actions

First, in step 432, the device 107 prompts the user to select between either an identifier creation mode or a re-imaging mode. In step 434, if the identifier creation mode is selected, the system 101 permits the user to associate a new handwritten identifier with a set of information, as discussed above with respect to the Identifier Creation and Linking section. In step 436, if the identifier re-imaging mode is selected, the system 101 re-images the original copy of the identifier 102 using the imaging device 106.

In step 438, the image processing and matching module 110 compares the re-image of the original copy of the identifier 102 against the set of prerecorded identifiers stored in the database 112. In step 440, if the image processing and matching module 110 determines that the database 112 already contains one or more prerecorded identifiers which share more than the predetermined amount of similarity with the identifier 102, the image processing and matching module 110 either requests that the imaging device 106 transmit more information to help identify the handwritten identifier 102 or presents the user an opportunity to select which prerecorded handwritten identifier best corresponds to the re-imaged handwritten identifier 102.

In step 442, the image processing and matching module 110 matches the re-image of the original copy with the original copy stored within the set of prerecorded identifiers. Then, in step 444, the computer system 101 retrieves the set of information associated with the handwritten identifier 102.

While one or more embodiments of the present invention have been described, those skilled in the art will recognize that various modifications may be made. Variations upon and modifications to these embodiments are provided by the present invention, which is limited only by the following claims.

What is claimed is:

1. A method for information management, comprising:
receiving a first image produced from scanning an original copy of a handwritten identifier in response to a first user command;
comparing the identifier to a set of prerecorded identifiers;
adding the identifier to the set of prerecorded identifiers, if the identifier shares less than a predetermined similarity with any identifier within the set of prerecorded identifiers;
linking the identifier to a set of information;
receiving a second image produced from scanning the original copy a second time in response to a second user command;
matching the second scan of the original copy with the first scan of the original copy;
retrieving the set of information in response to the matching;
computing a signature of the identifier; and
requesting a new identifier if the signature shares more than a predetermined similarity with a prerecorded identifier;
wherein computing includes selecting a set of identifier features for the signature which are scale and rotation invariant.

2. The method of claim 1, wherein:
scanning an original copy of a handwritten identifier includes scanning the original copy using a first imaging device; and
scanning the original copy a second time includes scanning the original copy using a second imaging device.

3. The method of claim 1:
wherein the identifier includes a hand-delimited existing mark.

4. The method of claim 1:
wherein the identifier is a human created surface irregularity.

5. The method of claim 1:
wherein the identifier is a hand drawn scribble.

6. The method of claim 1, further comprising:
requesting a new identifier in response to determining that the original copy of the handwritten identifier shares more than the predetermined similarity with a prerecorded identifier.

7. The method of claim 1:
wherein scanning includes imaging the identifier and a set of background information; and
further comprising distinguishing the set of background information from the identifier.

8. The method of claim 1:
further comprising,
partitioning the set of prerecorded identifiers into a predefined set of groups;
selecting one of the predefined groups; and
wherein comparing includes comparing the identifier only against prerecorded identifiers within the selected group.

9. The method of claim 1:
wherein computing includes normalizing the identifier in scale and rotation.

10. The method of claim 1:
wherein linking the identifier to the set of information includes linking the identifier to at least one of a GUID, a SKU, a URL, and a telephone number, and
wherein retrieving the set of information comprises retrieving at least one of the GUID, SKU, URL, and telephone number in response to the matching.

11. The method of claim 1:
wherein linking includes associating the set of information with a set of action types.

12. The method of claim 1:
further comprising, displaying information in response to the set of information.

13. The method of claim 1:
further comprising, effecting an action in response to the set of information.

14. The method of claim 1, further comprising:
placing the identifier on a physical object.

15. The method of claim 1, further comprising:
placing the identifier on paper.

16. A method for information management, comprising:
partitioning a set of prerecorded identifiers into a predefined set of groups;
selecting one of the predefined groups;
scanning an original copy of a handwritten identifier in response to a first user command;
comparing the identifier only against prerecorded identifiers within the selected group;

adding the identifier to the set of prerecorded identifiers, if the identifier shares less than a predetermined similarity with any identifier within the selected group ;
requesting a new identifier, if the identifier shares more than the predetermined similarity with a prerecorded identifier in the selected group;
linking the identifier to a set of information;
scanning the original copy a second time in response to a second user command;
matching the second scan of the original copy with the first scan of the original copy;
retrieving the set of information in response to the matching; and
effecting actions associated with the set of information.

* * * * *

UNITED STATES PATENT AND TRADEMARK OFFICE
CERTIFICATE OF CORRECTION

| | | |
|---|---|---|
| PATENT NO. | : 7,840,571 B2 | Page 1 of 1 |
| APPLICATION NO. | : 10/835684 | |
| DATED | : November 23, 2010 | |
| INVENTOR(S) | : George H. Forman et al. | |

It is certified that error appears in the above-identified patent and that said Letters Patent is hereby corrected as shown below:

In column 11, line 3, in Claim 16, delete "group ;" and insert -- group; --, therefor.

Signed and Sealed this
Twenty-second Day of March, 2011

David J. Kappos
*Director of the United States Patent and Trademark Office*